United States Patent
Roobol et al.

(10) Patent No.: US 6,301,479 B1
(45) Date of Patent: Oct. 9, 2001

(54) TECHNIQUE FOR PROVIDING A SECURE LINK IN A MOBILE COMMUNICATION SYSTEM

(75) Inventors: Christiaan Roobol, Aachen (DE); Mathias Johansson, Sollentuna (SE); Raul Söderstrom, Kyrkslatt (FI); Bela Rathonyi, Malmö (SE); Joachim Sachs, Aachen (DE)

(73) Assignee: Telefonaktiebolaget LM Ericsson, Stockhom (SE)

( * ) Notice: Subject to any disclaimer, the term of this patent is extended or adjusted under 35 U.S.C. 154(b) by 0 days.

(21) Appl. No.: 09/349,899

(22) Filed: Jul. 8, 1999

(51) Int. Cl.[7] .................................................. H04L 12/413
(52) U.S. Cl. ........................... 455/436; 455/410; 455/414
(58) Field of Search .................................... 455/436, 449, 455/414, 560, 410, 411

(56) References Cited

FOREIGN PATENT DOCUMENTS

WO 99/34635   7/1999 (WO).

OTHER PUBLICATIONS

John Scourias; Overview of the GLobal System for Mobile Communications; 1996, 1997; 14 page; Website ccnga.uwaterloo.ca/~jscouria/GSM/gsmreport.html.

Raj Jain; Wireless ATM—An Overview; 1997; 10 pages; Website cis.ohio–state.edu/~jain/cis788–97/wirelessatm/index.htm#rrc.

Peter Rysavy; Paper: General Packet Radio Service (GPRS); Sep. 30, 1998; 6 pages; Website pcsdata.com/pa-prysavy.htm.

Nokia; Third Generation—personal, multimedia mobile communications; 1995–1998; 19 pages; Website nokia.com/3g/index.html.

*Primary Examiner*—Daniel Hunter
*Assistant Examiner*—Thuan T. Nguyen
(74) *Attorney, Agent, or Firm*—Jenkens & Gilchrist P.C.

(57) ABSTRACT

A technique for providing a secure link when transitioning between pairs of link layer protocol entities in a mobile communication system is disclosed. The first pair of link layer protocol entities includes a first transmitting link layer protocol entity and a first receiving link layer protocol entity. The second pair of link layer protocol entities includes a second transmitting link layer protocol entity and a second receiving link layer protocol entity. The technique is realized by first suspending data transmissions from the first transmitting link layer protocol entity to the first receiving link layer protocol entity, and then initiating data transmissions from the second transmitting link layer protocol entity to the second receiving link layer protocol entity. Unacknowledged segmented data in the first transmitting link layer protocol entity is then tunneled from the first transmitting link layer protocol entity to the first receiving link layer protocol entity through the second transmitting link layer protocol entity and the second receiving link layer protocol entity.

40 Claims, 8 Drawing Sheets

TECHNIQUE FOR PROVIDING A SECURE LINK IN A MOBILE COMMUNICATION SYSTEM

FIELD OF THE INVENTION

The present invention relates generally to mobile communication systems and, more particularly, to a technique for providing a secure link when transitioning from a first pair of link layer protocol entities to a second pair of link layer protocol entities in a mobile communication system.

BACKGROUND OF THE INVENTION

Referring to FIG. 1, there is shown a schematic diagram of a typical cellular mobile communication system 10. The system 10 includes a Core Network (CN) 12, a Radio Access Network (RAN) 14, and a plurality of Mobile Stations (MS) 16. The RAN 14 is divided into controller nodes 18 and Base Transceiver Station (BTS) nodes 20. Of course, as will be appreciated by those having ordinary skill in the art, the RAN 14 may be made up of several RANs, each having one or more controller nodes 18 and BTS nodes 20. The hierarchy of the system is such that the CN 12 is connected to several controller nodes 18, each controller node 18 is connected to several BTS nodes 20, and each BTS node 20 services one or more MS 16.

Due to error characteristics associated with the radio interface between an MS 16 and a servicing BTS node 20, an Automatic Repeat Request (ARQ) protocol can optionally be executed between the MS 16 and the RAN 14 to reduce the residual error rate. The function of the ARQ protocol is to take care of errors that are introduced as a result of the radio interface (e.g., due to interference). However, when the MS 16 moves around within the system 10, a handover may occur that results in moving the execution of the ARQ protocol between different controller nodes 18. To insure that no user data is lost during a handover, certain mechanisms must be implemented. There are presently three known mechanisms for securing user data in the case of a handover of the ARQ protocol between different controller nodes 18.

In the first known mechanism for securing user data in the case of a handover of the ARQ protocol between different controller nodes 18, which is adequately described by R. Cohen et al. in "Handover in a Micro-Cell Packet Switched Mobile Network", ACM Journal of Wireless Networks, Vol. 2, No. 1, 1996, pp. 13–25, and by E. Ayanoglu et al. in "AIRMAIL: A Link-Layer Protocol for Wireless Networks", ACM/Baltzer Wireless Networks Journal, Vol. 1, 1995, pp. 47–60, when the handover is performed, the entire protocol state, including the state variables and buffers, from the ARQ protocol entity in the RAN 14 are moved/transferred from an origination controller node 18 to a destination controller node 18. Using this mechanism, the ARQ protocol entity in the MS 16 does not need to know when the handover occurs. In the case of a General Packet Radio Service (GPRS) system having two or more Serving GPRS Support Nodes (SGSN's) wherein an inter-SGSN handover takes place, only the downlink buffer is moved/transferred from the origination SGSN to the destination SGSN, and the protocol states of the buffers are synchronized between the MS 16 and the destination SGSN by means of handover signaling (see GSM 03.60—"Service Description").

The main benefits of this first mechanism are that no unnecessary re-transmission of the user data is required over the radio interface, and that the ARQ protocol in the MS 16 can be unaware of the handover, which also makes the implementation less expensive. However, this first mechanism is limited to intra-system handovers, where the same ARQ protocol with the same configuration is used throughout the system. Thus, it will no longer be useful in future systems where it will be possible to use different ARQ protocol configurations within the same RAN, and where there can be different sizes of protocol data units (PDU's) associated with the different ARQ protocol configurations. In addition, it can be very complex to move an entire protocol state.

In the second known mechanism for securing user data in the case of a handover of the ARQ protocol between different controller nodes 18, which is specifically used in GPRS systems, the user data is secured by having 2 levels of ARQ protocols in the system 10. The first ARQ protocol, called a Radio Link Control (RLC) protocol, is executed between an MS 16 and the RAN 14 (e.g., at a Base Station Controller (BSC) node) and is used to take care of errors that are introduced as a result of the radio interface (see GSM 04.60—"Radio Link Control/Medium Access Control"). The second ARQ protocol, called a Logical Link Control (LLC) protocol, is executed between an MS 16 and the CN 12 (e.g., at an SGSN node) (see GSM 04.64—"Logical Link Control (LLC) Layer Specification"). When a handover takes place, potentially lost user data is retransmitted by the ARQ protocol within the LLC protocol. The RLC protocol, on the other hand, is re-started in both the MS 16 and the BSC when a handover is performed.

The main benefit of this second mechanism is that it can handle inter-system handovers. However, this second mechanism has major disadvantages. For instance, unnecessary radio resources are wasted due to the overhead associated with the second ARQ protocol. In GPRS, the overhead that is transmitted with a third layer (L3) PDU is on the order of 7 bytes. This can be compared to the size of a Van Jacobsen compressed Transmission Control Protocol (TCP) acknowledgment, which is under 10 bytes when using a Point-to-Point Protocol (PPP). Thus, when transmitting TCP acknowledgments in an L3 PDU, the size is almost doubled. Another disadvantage of this second mechanism is that the cost in terms of memory and processing power of having 2 levels of ARQ protocols in the MS 16 is significantly higher than for a single ARQ protocol.

In the third known mechanism for securing user data in the case of a handover of the ARQ protocol between different controller nodes 18, a sender of second layer (L2) ARQ protocol PDUs is required to keep all the L2 PDUs, carrying an L3 PDU, in a buffer until the whole L3 PDU has been acknowledged. Then, when a handover is performed, all the L3 PDUs are moved to the new L2_ARQ protocol entity, which then segments these L3 PDUs into new L2 PDUs and retransmits them.

Similar to the second mechanism, the main benefit of this third mechanism is that it can handle inter-system handovers. However, this third mechanism also has major disadvantages. For instance, extra buffer space is required because the sender of the L2_ARQ protocol PDUs is required to keep all the L2 PDUs, carrying a L3 PDU, in a buffer until the whole L3 PDU has been acknowledged. Also, when a handover takes place, all L2 PDUs of an L3 PDU are retransmitted by the new L2_ARQ protocol. That is, even the L2 PDUs which were previously acknowledged are retransmitted. This is of course not optimal and a major disadvantage of this third mechanism.

In view of the foregoing, it would be desirable to provide a technique for providing a secure link between a mobile station and a core network during a handover or a protocol reconfiguration in a mobile communication system which overcomes the above-described inadequacies and shortcomings. More particularly, it would be desirable to provide a technique for providing a secure link between a mobile station and a core network during a handover or a protocol reconfiguration in a mobile communication system which does not transfer the entire state of an ARQ protocol, which does not use a second ARQ protocol level, which does not retransmit L2_ARQ PDUs which have already been acknowledged, and which does not need to store already acknowledged L2_ARQ PDUs in a buffer of the sending L2_ARQ protocol entity.

SUMMARY OF THE INVENTION

According to the present invention, a technique for providing a secure link when transitioning from a first pair of link layer protocol entities to a second pair of link layer protocol entities in a mobile communication system is provided. The first pair of link layer protocol entities includes a first transmitting link layer protocol entity for segmenting data and transmitting segmented data, and a first receiving link layer protocol entity for receiving segmented data from the first transmitting link layer protocol entity and acknowledging the received segmented data. The second pair of link layer protocol entities includes a second transmitting link layer protocol entity for segmenting data and transmitting segmented data, and a second receiving link layer protocol entity for receiving segmented data from the second transmitting link layer protocol entity and acknowledging the received segmented data. Both the first pair of link layer protocol entities and the second pair of link layer protocol entities are preferably automatic repeat request protocol entities.

The transition from the first pair of link layer protocol entities to the second pair of link layer protocol entities can be due to a variety of reasons such as, for example, a handover in the mobile communication system or a protocol reconfiguration in the mobile communication system. The first pair of link layer protocol entities can utilize the same protocol as the second pair of link layer protocol entities, or the first pair of link layer protocol entities can utilize a different protocol than the second pair of link layer protocol entities. If the first pair of link layer protocol entities utilizes the same protocol as the second pair of link layer protocol entities, the first pair of link layer protocol entities can still be configured differently than the second pair of link layer protocol entities.

In a preferred embodiment, the technique is realized by first suspending data transmissions from the first transmitting link layer protocol entity to the first receiving link layer protocol entity, and then initiating data transmissions from the second transmitting link layer protocol entity to the second receiving link layer protocol entity. The unacknowledged segmented data in the first transmitting link layer protocol entity is then tunneled from the first transmitting link layer protocol entity to the first receiving link layer protocol entity through the second transmitting link layer protocol entity and the second receiving link layer protocol entity.

In accordance with other aspects of the present invention, the first pair of link layer protocol entities can be controlled by at least one first control protocol entity, and the second pair of link layer protocol entities can be controlled by at least one second control protocol entity. The data transmissions from the first transmitting link layer protocol entity to the first receiving link layer protocol entity can then be suspended by the at least one first control protocol entity, and the data transmissions from the second transmitting link layer protocol entity to the second receiving link layer protocol entity can then be initiated by the at least one second control protocol entity. It should be noted that the at least one first control protocol entity and the at least one second control protocol entity can be the same control protocol entity.

In accordance with further aspects of the present invention, untransmitted unsegmented data in the first transmitting link layer protocol entity is preferably transferred from the first transmitting link layer protocol entity to the second transmitting link layer protocol entity. Alternatively, untransmitted unsegmented data in the first transmitting link layer protocol entity can be segmented and then transferred from the first transmitting link layer protocol entity to the second transmitting link layer protocol entity for tunneling. Meanwhile, segmented data in the first transmitting link layer protocol entity can be assembled and transferred from the first transmitting link layer protocol entity to the second transmitting link layer protocol entity.

In accordance with still further aspects of the present invention, a status message can be sent from the first receiving link layer protocol entity to the first transmitting link layer protocol entity prior to tunneling the unacknowledged segmented data from the first transmitting link layer protocol entity to the first receiving link layer protocol entity through the second transmitting link layer protocol entity and the second receiving link layer protocol entity. Also, the first receiving link layer protocol entity can be notified of the end of the unacknowledged segmented data to be tunneled from the first transmitting link layer protocol entity to the first receiving link layer protocol entity through the second transmitting link layer protocol entity and the second receiving link layer protocol entity. If the first pair of link layer protocol entities are controlled by at least one first control protocol entity, and the second pair of link layer protocol entities are controlled by at least one second control protocol entity, then a sequence number of a last unacknowledged data segment in the first transmitting link layer protocol entity can be sent from the at least one first control protocol entity to the at least one second control protocol entity to notify the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity. Alternatively, an indication of the number of tunneled unacknowledged segmented data can be sent from the at least one first control protocol entity to the at least one second control protocol entity to notify the first receiving link layer protocol entity of the end of the unacknowledged segmented data tunneled from the first transmitting link layer protocol entity to the first receiving link layer protocol entity through the second transmitting link layer protocol entity and the second receiving link layer protocol entity. Alternatively still, an indication of the amount of tunneled unacknowledged segmented data can be sent from the at least one first control protocol entity to the at least one second control protocol entity to notify the first receiving link layer protocol entity of the end of the unacknowledged segmented data tunneled from the first transmitting link layer protocol entity to the first receiving link layer protocol entity through the second transmitting link layer protocol entity and the second receiving link layer protocol entity.

In accordance with still further aspects of the present invention, a sequence number of a last unacknowledged data segment in the first transmitting link layer protocol entity can be sent from the first transmitting link layer protocol entity to the first receiving link layer protocol entity prior to tunneling the unacknowledged segmented data to notify the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity. Alternatively, a message indicating that the previous tunneled unacknowledged segmented data was the last tunneled unacknowledged segmented data can be sent from the first transmitting link layer protocol entity to the first receiving link layer protocol entity after the last tunneled unacknowledged segmented data to notify the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity. Alternatively still, a message containing an indication of the amount of tunneled unacknowledged segmented data can be sent from the second transmitting link layer protocol entity to the second receiving link layer protocol entity to notify the first receiving link layer protocol entity of the end of the unacknowledged segmented data tunneled from the first transmitting link layer protocol entity to the first receiving link layer protocol entity through the second transmitting link layer protocol entity and the second receiving link layer protocol entity. Alternatively even still, a message containing a sequence number of a last unacknowledged data segment in the first transmitting link layer protocol entity can be sent from the second transmitting link layer protocol entity to the second receiving link layer protocol entity prior to tunneling the unacknowledged segmented data to notify the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity. If such is the case, the sequence number is signaled to the second transmitting link layer protocol entity from the first transmitting link layer protocol entity prior to sending the message, and then signaled to the first receiving link layer protocol entity from the second receiving link layer protocol entity after sending the message. Alternatively even still, an indication of the number of tunneled unacknowledged segmented data can be sent from the second transmitting link layer protocol entity to the second receiving link layer protocol entity to notify the first receiving link layer protocol entity of the end of the unacknowledged segmented data tunneled from the first transmitting link layer protocol entity to the first receiving link layer protocol entity through the second transmitting link layer protocol entity and the second receiving link layer protocol entity. If such is the case, the number of tunneled unacknowledged segmented data is signaled to the second transmitting link layer protocol entity from the first transmitting link layer protocol entity prior to sending the indication, and then signaled to the first receiving link layer protocol entity from the second receiving link layer protocol entity after sending the indication.

In accordance with still further aspects of the present invention, the end of the unacknowledged segmented data to be tunneled from the first transmitting link layer protocol entity to the first receiving link layer protocol entity through the second transmitting link layer protocol entity and the second receiving link layer protocol entity can be signaled to the second transmitting link layer protocol entity from the first transmitting link layer protocol entity. A message indicating the end of the unacknowledged segmented data to be tunneled from the first transmitting link layer protocol entity to the first receiving link layer protocol entity through the second transmitting link layer protocol entity and the second receiving link layer protocol entity can then be sent from the second transmitting link layer protocol entity to the second receiving link layer protocol entity. The end of the unacknowledged segmented data to be tunneled from the first transmitting link layer protocol entity to the first receiving link layer protocol entity through the second transmitting link layer protocol entity and the second receiving link layer protocol entity can then be signaled to the first receiving link layer protocol entity from the second receiving link layer protocol entity.

In accordance with still further aspects of the present invention, the first pair of link layer protocol entities can be terminated after all of the unacknowledged segmented data has been tunneled. Alternatively, the first pair of link layer protocol entities can be terminated after a predetermined period of time.

In accordance with still further aspects of the present invention, unacknowledged segmented data in the first transmitting link layer protocol entity can be tunneled from the first transmitting link layer protocol entity to the first receiving link layer protocol entity through the second transmitting link layer protocol entity and the second receiving link layer protocol entity by first sending the unacknowledged segmented data from the first transmitting link layer protocol entity to the second transmitting link layer protocol entity. The unacknowledged segmented data is then transmitted from the second transmitting link layer protocol entity to the second receiving link layer protocol entity. The unacknowledged segmented data is then sent from the second receiving link layer protocol entity to the first receiving link layer protocol entity.

In accordance with still further aspects of the present invention, the unacknowledged segmented data can be marked before it is transmitted from the second transmitting link layer protocol entity to the second receiving link layer protocol entity. The unacknowledged segmented data can be marked utilizing, for example, a length indicator field in an acknowledged mode data protocol data unit, or a special field in a control protocol data unit.

In accordance with still further aspects of the present invention, the unacknowledged segmented data can be transmitted from the second transmitting link layer protocol entity to the second receiving link layer protocol entity over a dedicated communication link. The unacknowledged segmented data is preferably transmitted from the second transmitting link layer protocol entity to the second receiving link layer protocol entity before any higher layer data so as to insure sequence order integrity.

In accordance with still further aspects of the present invention, tunneled unacknowledged segmented data is typically combined with acknowledged segmented data in the first receiving link layer protocol entity, and the combined segmented data is then assembled. The assembled combined data can then be sent directly to a higher layer protocol entity. Alternatively, the assembled combined data can be sent to a higher layer protocol entity through the second receiving link layer protocol entity. In any event, the assembled combined data is preferably sent to a higher layer protocol entity before the second receiving link layer protocol entity sends any data to the higher layer protocol entity so as to insure sequence order integrity. Also, the second receiving link layer protocol entity can be notified that all the assembled combined data has been sent to the higher layer protocol entity so as to insure sequence order integrity.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
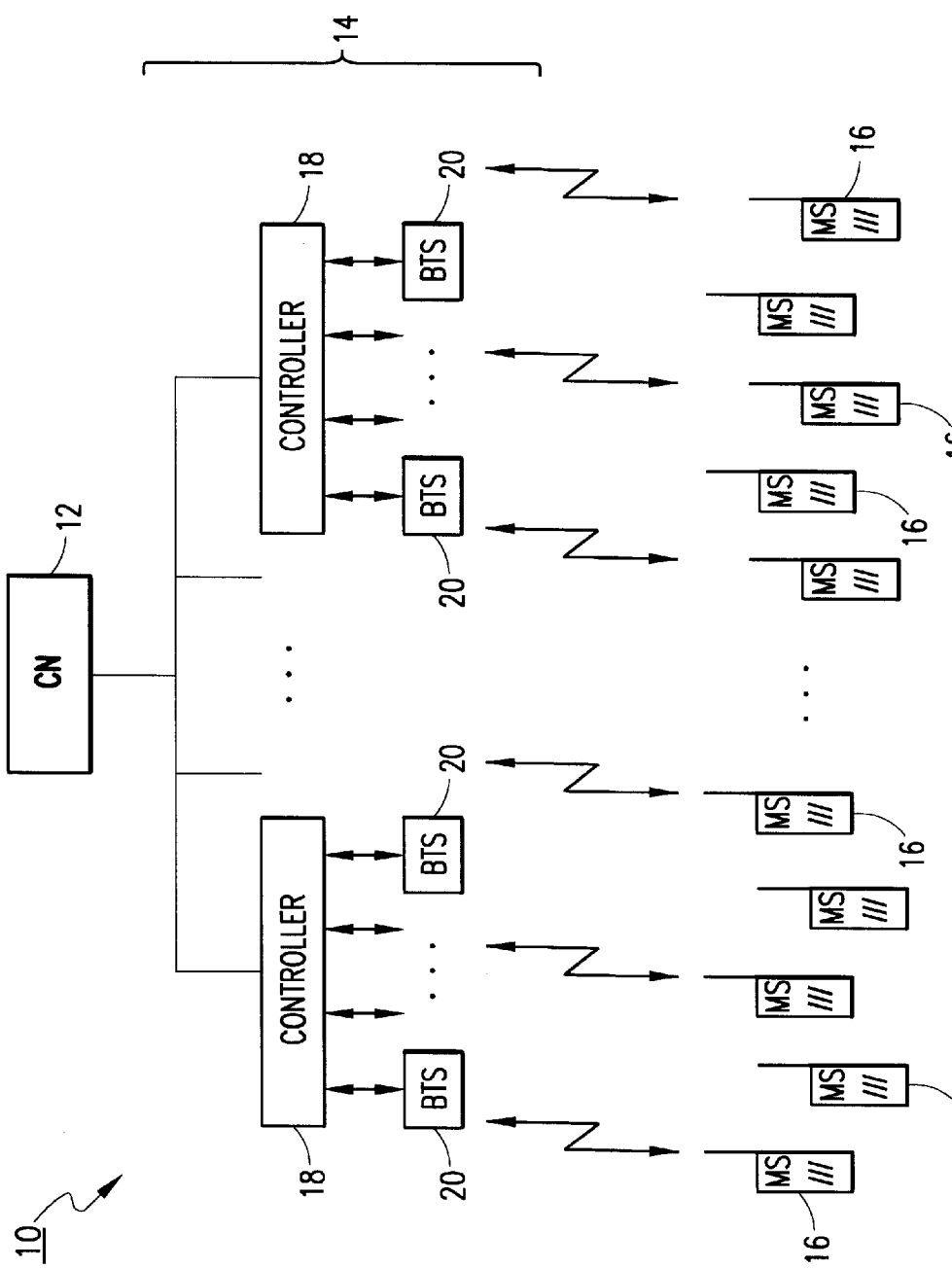
FIG. 1 is a schematic diagram of a typical mobile cellular system including a Core Network (CN), a Radio Access Network (RAN), and a plurality of Mobile Stations (MS).
Figure 2:
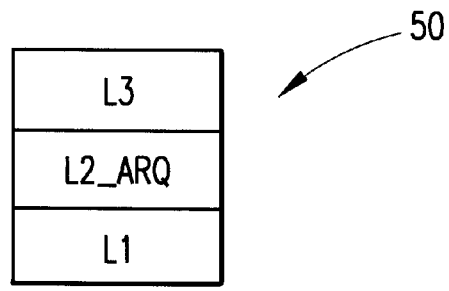
FIG. 2 is an illustration of a generic protocol stack for showing specific protocols on different hierarchical layers that are used within a cellular mobile communication system in accordance with the present invention.

Referring to FIG. 2, there is shown a generic protocol stack 50 which will be used in this detailed description to refer to specific protocols on different hierarchical layers that are used within a cellular mobile communication system operating in accordance with the present invention. It should be noted, however, that the present invention is not limited to the use of any one particular protocol on any of the different hierarchical layers. For instance, the L3 layer is used to refer to any network protocol such as, for example, Internet Protocol (IP). However, the L3 layer may also include a framing protocol such as, for example, Point-to-Point Protocol (PPP). The L3 layer may further include a control plane protocol such as, for example, Radio Resource Control (RRC), which is used in a Universal Mobile Telecommunication System (UMTS). Thus, the L3 layer refers to any protocol that produces a protocol data unit (PDU) that is transferred to the layer below, which in this case is the L2_ARQ layer.

The L2_ARQ layer is used to refer to a link layer protocol such as, for example, Radio Link Control (RLC), that potentially segments L3 PDUs into smaller L2_ARQ PDUs and/or concatenates several L3 PDUs into L2_ARQ PDUs and implements ARQ functionality on the basis of these L2_ARQ PDUs. Whatever protocol the L2_ARQ layer represents, the L2_ARQ protocol follows rules regarding the retransmission of L2 ARQ PDUs. For example, for any form of ARQ, the sending L2 ARQ has to buffer each L2_ARQ PDU until the receiving L2_ARQ positively acknowledges the receipt of same. Upon receiving the acknowledgment, the sending L2_ARQ is allowed to delete the acknowledged L2_ARQ PDU from its send buffer.

The L_ARQ protocol may have several different operational modes such as, for example, unreliable, semi-reliable, and fully reliable, for the transmission of higher layer data (i.e., L3 PDUs). The latter two modes can either be combined with in-sequence or out-of-sequence delivery operation.

The L1 layer is used to refer to the physical layer of a radio link. It can be any radio transmission technology used in today's or future mobile communication networks (e.g., GSM, UMTS, or wireless LANs).

In state-of-the-art cellular mobile communication systems, there exist two peer entities of the L2_ARQ protocol, one running in a Mobile Station (MS) and one in a Radio Access Network (RAN). Examples of such systems are the Global System for Mobile Communications (GSM)/General Packet Radio Service (GPRS) and the UMTS systems, and the L2_ARQ protocol in both is the RLC protocol.

Figure 3:
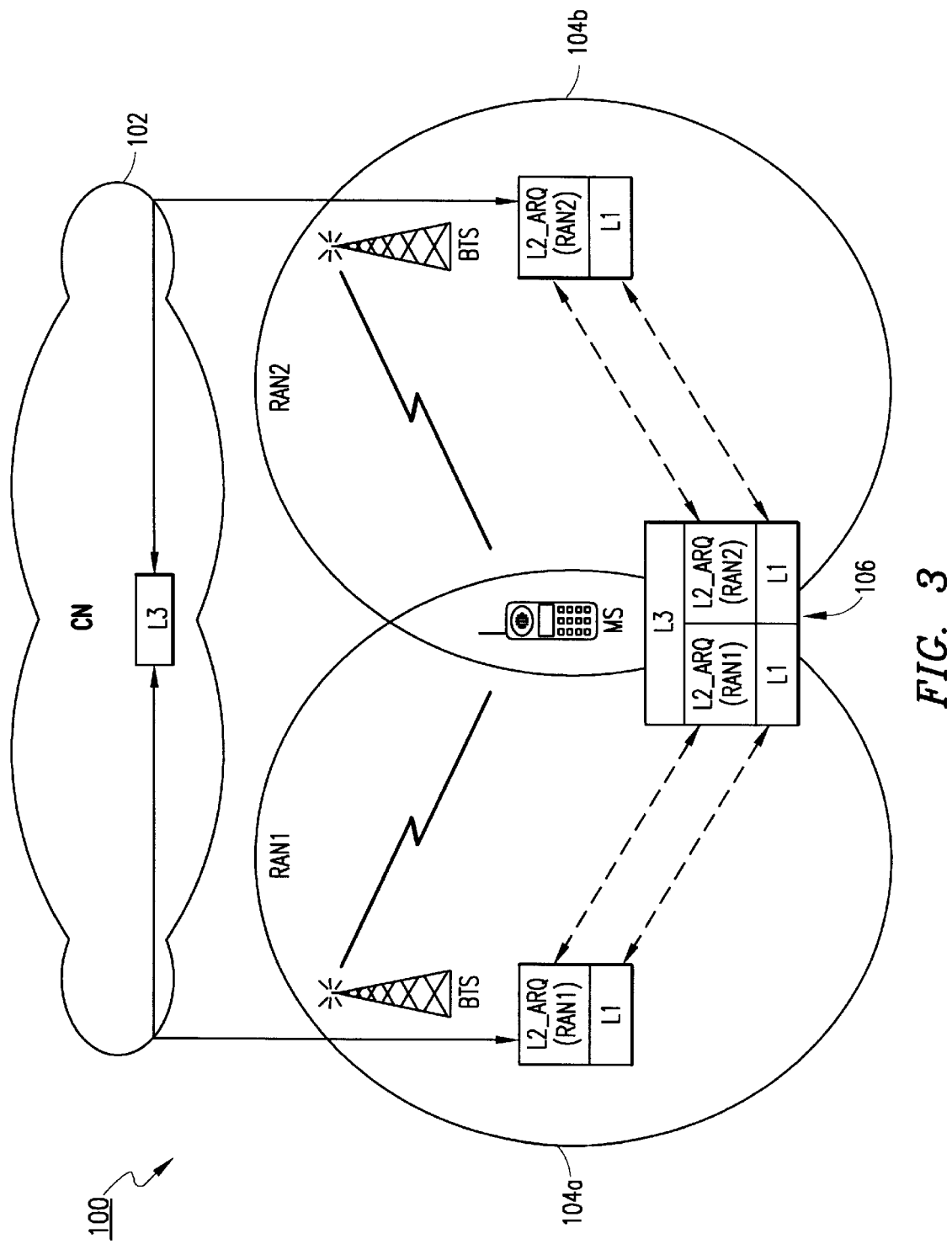
FIG. 3 is a schematic diagram of a cellular mobile communication system including a CN, two different RANs, and an MS which are involved in a technique for providing a secure link between an MS and a CN during handover scenarios or L2_ARQ protocol reconfigurations in accordance with the present invention.

Referring to FIG. 3, there is shown a cellular mobile communication system 100 which will be used in this detailed description to describe a technique for providing a secure link between an MS and a Core Network (CN) during handover scenarios or L2_ARQ protocol reconfigurations in accordance with the present invention. The system 100 comprises a CN 102, which is connected to two different RANs 104, and an MS 106. As seen in FIG. 3, L3 PDUs are transmitted between the MS 106 and the CN 102 through different L2_ARQ protocols depending on the currently used RAN 104. The technique described in this detailed description is not limited to the number of RANs 104 that are connected to the CN 102. That is, any number of RANs 104 are allowed by the technique described herein.

It is assumed that there exists peer-to-peer communication between any two L2_ARQ protocol entities for all of the different RANs 104 which are involved. The peer entities are executed in the MS 106 and in a network node of each RAN 104 which is involved. It is also assumed that handover can take place both within one RAN 104 (intra-system), and between different types of RANs 104 (inter-system). In either case, when a handover occurs, the execution point for the L2_ARQ protocol entity may be moved to a new physical network node where a new L2_ARQ protocol entity is started which continues the communication with a new L2_ARQ peer. Optionally, an old restarted/reinitialized L2_ARQ protocol entity may be used.

After a handover or an L2_ARQ protocol reconfiguration (e.g., a Radio Access Bearer (RAB) reconfiguration) has occurred, unacknowledged L2_ARQ PDUs in the old sending L2_ARQ protocol entity are tunneled through the new L2_ARQ protocol entities to the old receiving L2_ARQ protocol entity. That is, after a handover or an L2_ARQ protocol reconfiguration has occurred, the old L2_ARQ protocol entities enter into a tunneling state wherein they do not perform any ARQ functions but still communicate data via the new L2_ARQ protocol entities. In this tunneling state, the old L2_ARQ PDUs are tunneled via the new L2_ARQ protocol entities to the old receiving L2_ARQ protocol entity, which reassembles the old L2_ARQ PDUs into L3 PDUs and delivers them to the receiving L3 protocol entity. After all the old L2_ARQ PDUs have been tunneled via the new L2_ARQ protocol entities to the old receiving L2_ARQ protocol entity, reassembled into L3 PDUs, and then delivered to the receiving L3 protocol entity, the old L2_ARQ protocol entities are terminated.

The above-described technique requires that a complete L3 PDU is either transmitted through the old sending L2_ARQ protocol entity or through the new sending L2_ARQ protocol entity. Thus, the last PDU in the old sending L2_ARQ protocol entity consists of a last segment of an old L3 PDU and possibly padding. On the receiving side, the new receiving L2_ARQ protocol entity receives new L2_ARQ PDUs from the new sending L2_ARQ protocol entity and reassembles them into L2_ARQ SDUs. The new L2_ARQ protocol entities have to distinguish between L2_ARQ SDUs containing new L3 PDUs and L2_ARQ SDUs containing tunneled old L2_ARQ PDUs. This can be achieved by marking the PDUs and/or the SDUs, or by other means of signaling. New L2_ARQ PDUs that contain tunneled old L2_ARQ PDUs are reassembled into old L2_ARQ PDUs and passed along to the old receiving L2_ARQ protocol entity. New L2_ARQ PDUs that contain new L3 PDUs are reassembled into L3 PDUs and delivered to the receiving L3 protocol entity.

Figure 4:
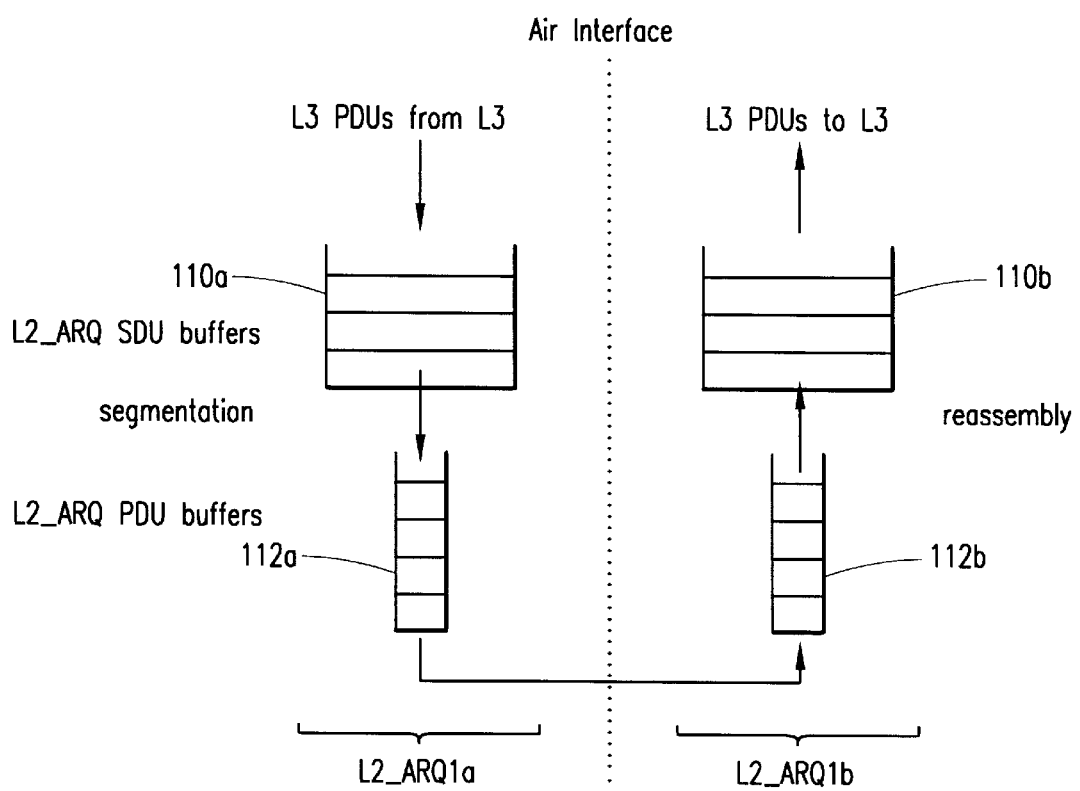
FIG. 4 is a flowchart showing data being transferred between two L2_ARQ protocol entities over an air interface.
Figure 5:
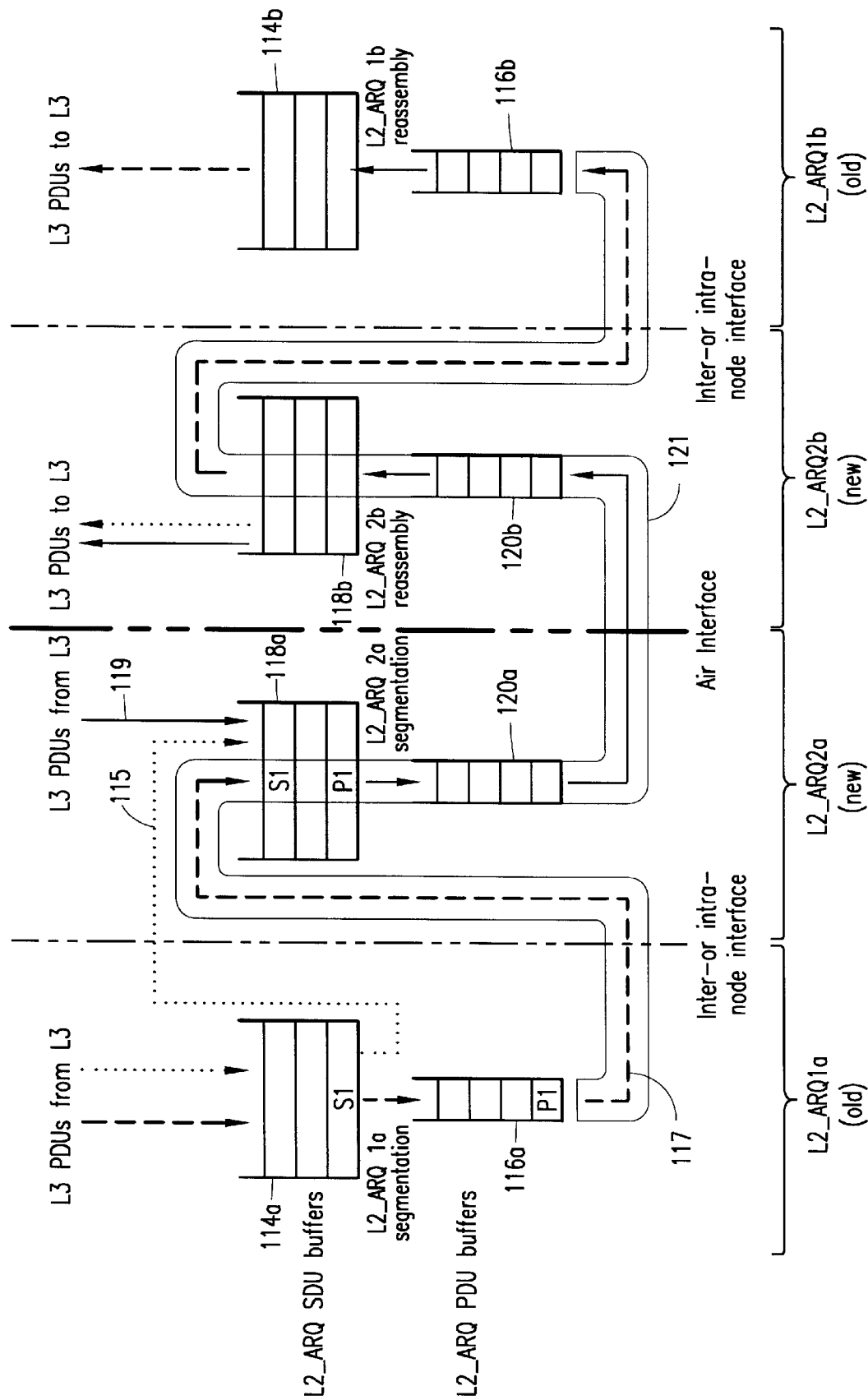
FIG. 5 is a flowchart showing data being transferred between two new L2_ARQ protocol entities over an air interface just after a handover or an L2_ARQ protocol reconfiguration has taken place in accordance with the present invention.

The above-described technique can be better understood with reference to FIGS. 4 and 5. FIG. 4 shows data being transferred between two L2_ARQ protocol entities over an air interface. Both the sending L2_ARQ protocol entity (i.e., L2_ARQ 1a) and the receiving L2_ARQ protocol entity (i.e., L2_ARQ 1b) comprise an SDU data buffer 110 and a PDU data buffer 112. It shall be understood that these buffers are only logical buffers used for explaining the present invention. The data in the sending L2_ARQ protocol entity SDU data buffer 110a is higher layer data (i.e., L3 PDUs). This data has yet not been segmented into L2_ARQ PDUs or transmitted over the air interface by the sending L2_ARQ protocol entity (i.e., L2_ARQ 1a). The data in the sending L2_ARQ protocol entity PDU data buffer 112a consists of L2_ARQ PDUs. A PDU encapsulates either a part of an SDU or a full SDU. This is referred to as segmentation. If several SDUs are part of a PDU, then the several SDUs are referred to as being concatenated within the PDU.

It is assumed that an SDU resides in the sending L2_ARQ protocol entity SDU data buffer 110a until it is segmented and potentially concatenated and transferred to the sending L2_ARQ protocol entity PDU data buffer 112a. At that point, the whole SDU is moved into the sending L2_ARQ protocol entity PDU data buffer 112a. The PDUs sent from the sending L2_ARQ protocol entity (i.e., L2_ARQ 1a) over the air interface have to be acknowledged by the receiving L2_ARQ protocol entity (i.e., L2_ARQ 1b). When the sending L2_ARQ protocol entity receives an acknowledgement for a PDU, that PDU is discarded from the sending L2_ARQ protocol entity PDU data buffer 112a.

With the above definition of the buffers, it is understood that the sending L2_ARQ protocol entity PDU data buffer 112a may encapsulate both whole SDUs and parts of SDUs depending on what PDUs have been acknowledged by the sending L2_ARQ protocol entity. The data in the receiving L2_ARQ protocol entity PDU data buffer 112b will reside there until a whole SDU can be assembled. At that point, the assembled SDU will be transferred to the receiving L2_ARQ protocol entity SDU data buffer 110b.

FIG. 5 shows data being transferred between two new L2_ARQ protocol entities over an air interface just after a handover or an L2_ARQ protocol reconfiguration has taken place in accordance with the present invention. Both the old sending L2_ARQ protocol entity (i.e., L2_ARQ 1a) and the old receiving L2_ARQ protocol entity (i.e., L2_ARQ 1b) comprise an old SDU data buffer 114 and an old PDU data buffer 116. Similarly, both the new sending L2_ARQ protocol entity (i.e., L2_ARQ 2a) and the new receiving L2_ARQ protocol entity (i.e., L2_ARQ 2b) comprise a new SDU data buffer 118 and a new PDU data buffer 120. In this scenario, the old sending L2_ARQ protocol entity determines if PDUs in the old sending L2_ARQ protocol entity PDU data buffer 116a need to be reassembled into SDUs. If so, the reassembled SDUs are transferred to the old sending L2_ARQ protocol entity SDU data buffer 114a. The old sending L2_ARQ protocol entity SDU data buffer 114a will then contain SDUs encapsulating L3 PDUs, which are denoted as S1 in FIG. 5. These SDUs (S1) in the old sending L2_ARQ protocol entity SDU data buffer 114a are then transferred along path 115 to the new sending L2_ARQ protocol entity SDU buffer 118a. Meanwhile, any PDUs remaining the old sending L2_ARQ protocol entity PDU data buffer 116a, which are denoted as P1 in FIG. 5, are transferred along path 117 from the old sending L2_ARQ protocol entity PDU data buffer 116a to the new sending L2_ARQ protocol entity SDU data buffer 118a. These PDUs (P1) from the old sending L2_ARQ protocol entity PDU data buffer 116a serve as SDUs in the new sending L2_ARQ protocol entity. Additionally, new L3 PDUs are transferred directly between L3 and the new sending L2_ARQ protocol entity SDU data buffer 118a along path 119 after the handover/reconfiguration has occurred.

The data in the new sending L2_ARQ protocol entity SDU data buffer 118a is segmented and sent to the new sending L2_ARQ protocol entity PDU data buffer 120a. The data in the new sending L2_ARQ protocol entity PDU data buffer 120a is sent across the air interface to the new receiving L2_ARQ protocol entity PDU data buffer 120b. The data in the new receiving L2_ARQ protocol entity PDU data buffer 120b is assembled and sent to the new receiving L2_ARQ protocol entity SDU data buffer 118b. The data in the new receiving L2_ARQ protocol entity SDU data buffer 118b is either sent to the receiving L3 protocol entity or is sent to the old receiving L2_ARQ protocol entity PDU data buffer 116b. Any data in the old receiving L2_ARQ protocol entity PDU data buffer 116b is assembled and sent to the old receiving L2_ARQ protocol entity SDU data buffer 114b and then to the receiving L3 protocol entity.

Thus, in accordance with the present invention, any data (P1) which was residing in the old sending L2_ARQ protocol entity PDU data buffer 116a and transferred along path 117 from the old sending L2_ARQ protocol entity PDU data buffer 116a to the new sending L2_ARQ protocol entity SDU data buffer 118a at the time of the handover/reconfiguration is logically tunneled through tunnel 121 from the old sending L2_ARQ protocol entity PDU data buffer 116a to the old receiving L2_ARQ protocol entity PDU data buffer 116b.

There are mechanisms implemented in the new receiving L2_ARQ protocol entity which allow the new receiving L2_ARQ protocol entity to distinguish between L2_ARQ SDUs encapsulating tunneled old L2_ARQ PDUs and L2_ARQ SDUs encapsulating new L3 PDUs. These mechanisms are needed by the new receiving L2_ARQ protocol entity to correctly send the assembled L2_ARQ SDUs to the right buffer: the SDU data buffer 118*b* for new L3 PDUs and the PDU data buffer 116*b* for tunneled old L2_ARQ PDUs. This can be done by marking the PDUs and/or the SDUs, or, alternatively, by other rules combined with signaling.

If there is a rule that the data (P1) in the old sending L2_ARQ protocol entity PDU data buffer 116*a* is placed first in the new sending L2_ARQ protocol entity SDU data buffer 118*a*, then the new sending L2_ARQ protocol entity only needs to signal the number of L2_ARQ SDUs, or the number of new L2_ARQ PDUs, that encapsulate the tunneled old L2_ARQ PDUs in order for the receiver to distinguish between L3 PDUs and tunneled old L2_ARQ PDUs. The new receiving L2_ARQ protocol entity will then implicitly know where to send each assembled L2_ARQ SDU without having marked the PDUs and/or the SDUs. If concatenation of several L2_ARQ SDUs within a L2_ARQ PDU is supported by the new L2_ARQ protocol entities, together with signaling the number of new L2_ARQ PDUs including tunneled old L2_ARQ PDUs, then an additional rule will have to be defined. This rule defines that it is not possible to encapsulate a whole new L3 PDU in the last new L2_ARQ PDU including a tunneled old L2_ARQ PDU.

When marking is done there exist at least two different solutions. One solution is to allow two separate L2_ARQ PDU types, one corresponding to the new L3 PDUs and one corresponding to the PDUs that originate from the old sending L2_ARQ protocol entity (see description of FIG. 7 below). Another solution is to add a one bit field to the L2_ARQ SDU. This field can be set to one if the L2_ARQ SDU is actually a PDU from the old sending L2_ARQ protocol entity, and it can be cleared to zero if it is a new L3 PDU.

Figure 9:
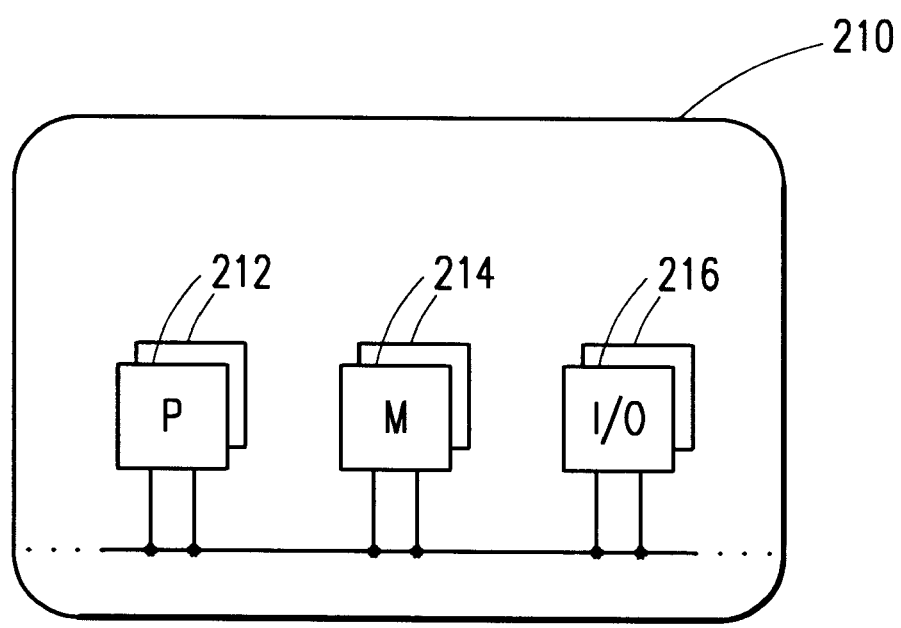
FIG. 9 is a schematic diagram of an exemplary protocol entity processing device for implementing the signaling involved in a handover or a protocol reconfiguration in a mobile communication system in accordance with the present invention.

The old and the new sending L2_ARQ protocol entities must be able to communicate with each other, just as the old and the new receiving L2_ARQ protocol entities must be able to communicate with each other. These communication links are necessary to establish the tunneling state in accordance with the present invention. The communication links are logical links which can be divided into several physical links. For example, the L2_ARQ network protocol entities could be in different nodes of the radio access network and the logical link could be established via several physical links involving several network nodes of the radio access network and/or the core network. Alternatively, both protocol entities could reside in the same node and even in the same hardware/software (e.g., in the same processing device wherein the logical link could be one or several device components (see FIG. 9)). In order to establish in-sequence delivery, the old receiving L2_ARQ protocol entity must signal to the new receiving L2_ARQ protocol entity that all of the old L2_ARQ PDUs are received correctly, reassembled into L3 PDUs, and delivered to the receiving L3 protocol entity. Only after that is the new receiving L2_ARQ protocol entity allowed to send SDUs to higher layers (i.e., the receiving L3 protocol entity).

When in the tunneling state, the old receiving L2_ARQ protocol entity needs to have knowledge about when the last old L2_ARQ PDU from the old sending L2_ARQ protocol entity has arrived. The present invention allows such information to be passed from the old sending L2_ARQ protocol entity to the old receiving L2_ARQ protocol entity.

One way to do this is by a rule stating that tunneled old L2_ARQ PDUs are placed first in the new receiving L2_ARQ protocol entity SDU data buffer 118*b* combined with signaling of the number of PDUs or SDUs holding tunneled old L2_ARQ PDUs. Then the new receiving L2_ARQ protocol entity implicitly knows when there are no more tunneled old L2_ARQ PDUs coming because it must be able to distinguish between L2_ARQ SDUs encapsulating new L3 PDUs and L2_ARQ SDUs encapsulating tunneled old L2_ARQ PDUs.

Another way to do this is to communicate the highest sequence number of the last old L2_ARQ PDU of the old sending L2_ARQ protocol entity to the old receiving L2_ARQ protocol entity. This sequence number may be transferred from the old sending L2_ARQ protocol entity to the old receiving L2_ARQ protocol entity via any appropriate signaling. Four solutions as to how this can be done are given below.

A first solution to this would be to signal the sequence number through a control protocol entity. This implies of course that the old L2_ARQ protocol entities inform the control protocol entity about this sequence number.

A second solution to this would be to send the sequence number in a special PDU (identified by a PDU Type field) containing the sequence number from the old sending L2_ARQ is protocol entity to the old receiving L2_ARQ protocol entity. This special PDU could be the first message to be transmitted before any L2_ARQ PDUs are tunneled. This special PDU is sent via the tunnel as well.

A third solution to this would be to send a special PDU (identified by a PDU Type field) after the last tunneled old L2_ARQ PDU from the old sending L2_ARQ protocol entity to the old receiving L2_ARQ protocol entity. This special PDU would indicate that the previous L2_ARQ PDU was the last L2_ARQ PDU to be tunneled. This special PDU is sent via the tunnel as well.

A fourth solution to this would be to send the sequence number in a special PDU (identified by a PDU Type field) containing the sequence number from the new sending L2_ARQ protocol entity to the new receiving L2_ARQ protocol entity. This special PDU would be the first message to be transmitted before any L2_ARQ PDUs are tunneled. The sequence number needs to be signaled from the old sending L2_ARQ protocol entity to the new sending L2_ARQ protocol entity and from the new receiving L2_ARQ protocol entity to the old receiving L2_ARQ protocol entity.

The knowledge about when the last tunneled L2_ARQ PDU has been received is used on the receiving side to know when the old receiving L2_ARQ protocol entity may be terminated. It is also necessary to enable in-sequence delivery of L3 PDUs at the receiver. The old receiving L2_ARQ protocol entity has to deliver all its data to the receiving L3 protocol entity and then indicate that it has finished before the new receiving L2_ARQ protocol entity may start delivering data to the receiving L3 protocol entity.

Figure 6:
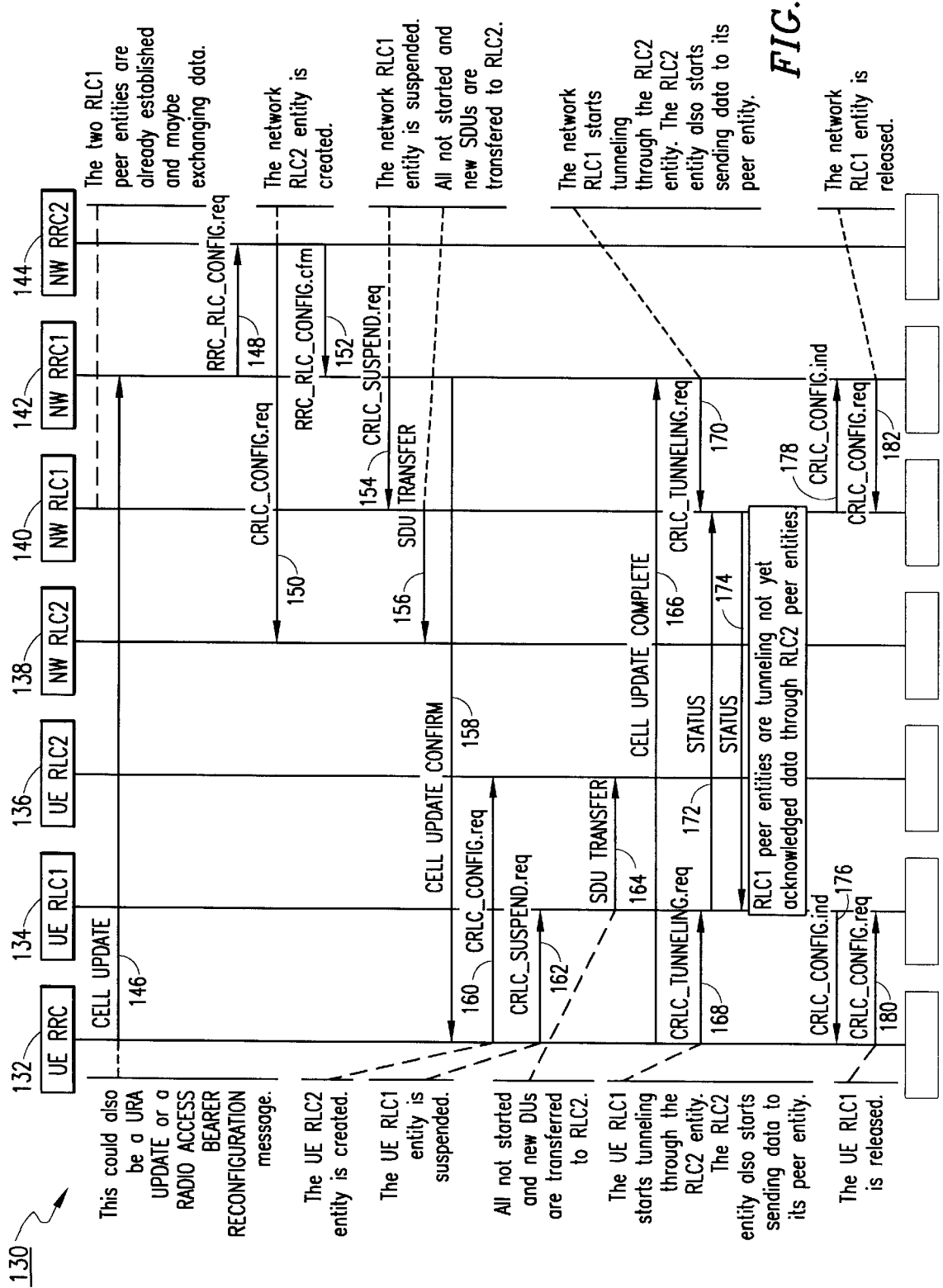
FIG. 6 is a signaling chart for a handover scenario in accordance with the present invention.

Referring to FIG. 6, there is shown a signaling chart 130 for a handover scenario in accordance with the present invention. The particular example shown in FIG. 6 is based upon a UMTS system and involves a User Equipment Radio Resource Control protocol entity 132 (UE RRC), a first User Equipment Radio Link Control protocol entity 134 (UE RLC1), a second User Equipment Radio Link Control protocol entity 136 (UE RLC2), a first Network Radio Link Control protocol entity 140 (NW RLC1), a second Network Radio Link Control protocol entity 138 (NW RLC2), a first Network Radio Resource Control protocol entity 142 (NW RRC1), and a second Network Radio Resource Control protocol entity 144 (NW RRC2). During a handover, the UE RRC entity 132 sends a cell update message 146 (CELL UPDATE) to the NW RRC1 entity 142. In response, the NW RRC1 entity 142 requests the NW RRC2 entity 144 to set up a new RLC protocol entity using a configuration request message 148 (RRC_RLC_CONFIG.req). The NW RRC2 entity 144 then sets up the NW RLC2 entity 138 using a configuration request message 150 (CRLC_CONFIG.req). After the NW RLC2 entity 138 has been set up, the NW RRC2 entity 144 confirms the creation of the NW RLC2 entity 138 with the NW RRC1 entity 142 using a configuration confirmation message 152 (RRC_RLC_CONFIG.cfm). The NW RLC1 entity 140 is then suspended by the NW RRC1 entity 142 using a suspension request message 154 (CRLC_SUSPEND.req), which causes the NW RLC1 entity 140 to stop transmitting data and enter into the tunneling state described above. Next, the unsegmented SDUs in the NW RLC1 entity 140 are sent to the SDU buffer of the NW RLC2 entity 138 via an SDU transfer message 156 (SDU TRANSFER). A cell update confirmation message 158 (CELL UPDATE CONFIRM) is then sent from the NW RRC1 entity 142 to the UE RRC entity 132. The cell update confirmation message 158 (CELL UPDATE CONFIRM) may contain an indication of the sequence number of the last PDU in the NW RLC1 entity 140.

Upon receipt of the cell update confirmation message 158 (CELL UPDATE CONFIRM), the UE RRC entity 132 sets up the UE RLC2 entity 136 using a configuration request message 160 (CRLC_CONFIG.req). In addition, the UE RLC1 entity 134 is suspended by the UE RRC entity 132 using a suspension request message 162 (CRLC_SUSPEND.req), which causes the UE RLC1 entity 134 to stop transmitting data and enter into the tunneling state described above. Next, the unsegmented SDUs in the UE RLC1 entity 134 are sent to the SDU buffer of the UE RLC2 entity 136 via an SDU transfer message 164 (SDU TRANSFER). A cell update completion message 166 (CELL UPDATE COMPLETE) is then sent from the UE RRC entity 132 to the NW RRC1 entity 142. The cell update completion message 166 (CELL UPDATE COMPLETE) may contain an indication of the sequence number of the last PDU in the UE RLC1 entity 134.

At this point, there is no data transfer between the UE RLC1 entity 134 and the NW RLC1 entity 140. That is, the UE is RLC2 entity 136 and the NW RLC2 entity 138 now perform the data transfer functions. However, any data remaining in the UE RLC1 entity 134 may now be tunneled through the UE RLC2 entity 136 once the UE RLC1 entity 134 receives a tunneling request message 168 (CRLC_TUNNELING.req) from the UE RRC entity 132. Likewise, any data remaining in the NW RLC1 entity 140 may now be tunneled through NW RLC2 entity 138 once the NW RLC1 entity 140 receives a tunneling request message 170 (CRLC_TUNNELING.req) from the NW RRC1 entity 142. It is desirable to start the tunneling with a status report, indicating which PDUs were received correctly, so that these need not be tunneled. For example, the UE RLC1 entity 134 sends a status report message 172 (STATUS) to the NW RLC1 entity 140, while the NW RLC1 entity 140 sends a status report message 174 (STATUS) to the UE RLC1 entity 134. The status report message 172 may also contain an indication of the sequence number of the last PDU in the UE RLC1 entity 134. Similarly, the status report message 174 may also contain an indication of the sequence number of the last PDU in the NW RLC1 entity 140.

After all the data in the UE RLC1 entity 134 has been tunneled and transmitted correctly, the UE RLC1 entity 134 indicates the same to the UE RRC entity 132 using a configuration indication message 176 (CRLC_CONFIG.ind). The UE RRC entity 132 then releases the UE RLC1 entity 134 using a configuration request message 180 (CRLC_CONFIG.req). Similarly, after all the data in the NW RLC1 entity 140 has been tunneled and transmitted correctly, the NW RLC1 entity 140 indicates the same to the NW RRC1 entity 142 using a configuration indication message 178 (CRLC_CONFIG.ind). The NW RRC1 entity 142 then releases the NW RLC1 entity 140 using a configuration request message 182 (CRLC_CONFIG.req).

At this point it should be noted that if in-sequence delivery is necessary, the UE RLC2 entity 136 and the NW RLC2 entity 138 should be notified that all UE RLC1 PDUs and all NW RLC1 PDUs have been received, respectively. After that, the UE RLC2 entity 136 and the NW RLC2 entity 138 can send the UE RLC2 SDUs and the NW RLC2 SDUs to higher layers, respectively.

At this point it should also be noted that the suspension request message 154 (CRLC_SUSPEND.req) and the suspension request message 162 (CRLC_SUSPEND.req) are somewhat misleading. In general, a protocol entity may be suspended, and then later may be resumed. In the particular example shown in FIG. 6, however, the RLC1 entities 134 and 140 do not resume, but rather enter a tunneling state.

Figure 7:
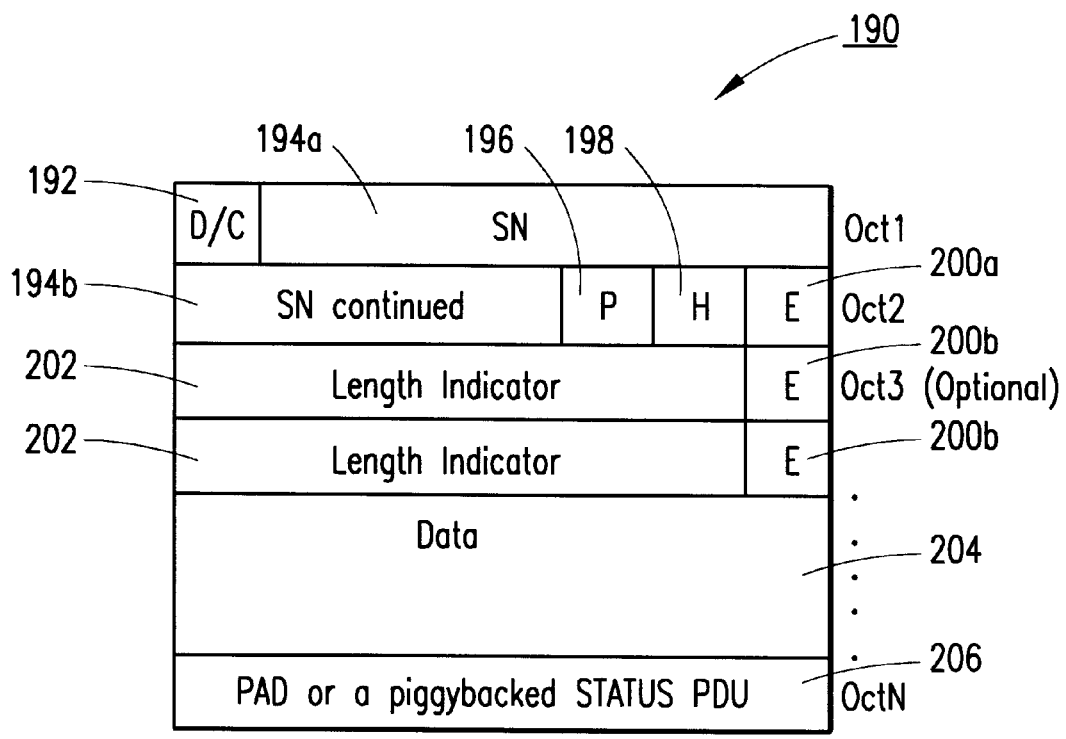
FIG. 7 shows the format of an L2_ARQ Acknowledged Mode Data (AMD) PDU in accordance with the present invention.

Referring to FIG. 7, there is shown a format of an L2_ARQ Acknowledged Mode Data (AMD) PDU 190, wherein L2_ARQ could be, for example, a Radio Link Control (RLC) protocol entity. The AMD PDU 190 includes a data/control (D/C) bit 192, indicating if the PDU is an AMD PDU or a Control PDU, a sequence number (SN) field 194, a poll (P) bit 196, a header compression (H) bit 198, one or more extension (E) bits 200, zero or more length indicator fields 202, one or more data segments 204, and an optional field 206 containing padding (PAD) or a piggybacked status PDU (STATUS PDU). The extension bits 200 and the length indicator fields 202 can be of particular interest with respect to the present invention. The extension bit 200a indicates whether the next field will be data or a length indicator. The length indicator field 202 is used when concatenation or padding takes place in the PDU. In either case, it indicates where the concatenation or padding starts. If concatenation takes place, the length indicator field 202 indicates the border between the two higher layer segments. If padding takes place, the length indicator field 202 is assigned a specific value. The extension bit 200b is then set to indicate that the next octet will be yet another length indicator. The length indicator field 202 will then indicate the border between data and padding.

One of the length indicator fields 202 can also be used to indicate whether the data segments 204 contain tunneled RLC PDUs or L3 PDUs. To indicate the transport of tunneled RLC PDUs, the length indicator field 202 can be assigned a specific and reserved value.

Figure 8:
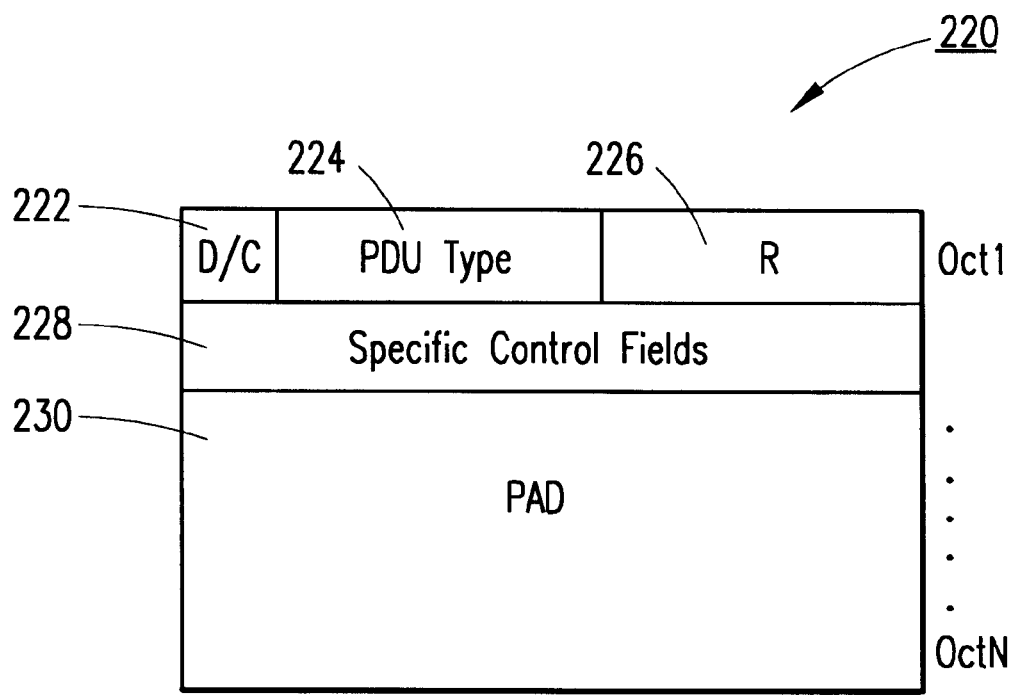
FIG. 8 shows the format of an L2_ARQ Control PDU in accordance with the present invention.

Referring to FIG. 8, there is shown a format of an L2_ARQ Control PDU 220, wherein again L2_ARQ could be, for example, a Radio Link Control (RLC) protocol entity. The Control PDU 220 includes a data/control (D/C) bit 222, indicating if the PDU is an AMD PDU or a Control PDU, a PDU Type field 224, specifying the type of control message, a reserved field 226, zero or more Specific Control Fields 228, depending on the type of control message, and padding (PAD) 230 to fill in the rest of the Control PDU 220. The Control PDU 220 can be used to transfer the sequence number of the, last untransmitted segmented L2_ARQ PDU of the old sending L2_ARQ protocol entity to the old receiving L2_ARQ protocol entity. The control message can be defined as either a PDU of the old L2_ARQ link, which is then tunneled via the new L2_ARQ link, or a PDU of the new L2_ARQ link, in which case a sequence number is signaled between the old and new L2_ARQ protocol entities. In order to define such a control message, a specific value for the PDU Type field 224 is defined and the Specific Control Field 228 contains the sequence number.

At this point it should be noted that the signaling associated with the above-described handover scenario is typically controlled by processors acting upon instructions stored in or transmitted to associated memory devices. For example, referring to FIG. 9, each of the above-described protocol entities may have an associated processing device 210 having at least one processor (P) 212, memory (M) 214, and input/output (I/O) device 216, connected to each other by a bus 218, for implementing the signaling involved in the above-described handover scenario.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for providing a secure link when transitioning from a first pair of link layer protocol entities to a second pair of link layer protocol entities in a mobile communication system, the first pair of link layer protocol entities including a first transmitting link layer protocol entity for segmenting data and transmitting segmented data and a first receiving link layer protocol entity for receiving segmented data from the first transmitting link layer protocol entity and acknowledging the received segmented data, the second pair of link layer protocol entities including a second transmitting link layer protocol entity for segmenting data and transmitting segmented data and a second receiving link layer protocol entity for receiving segmented data from the second transmitting link layer protocol entity and acknowledging the received segmented data, the method comprising the steps of:

suspending data transmissions from the first transmitting link layer protocol entity to the first receiving link layer protocol entity;

initiating data transmissions from the second transmitting link layer protocol entity to the second receiving link layer protocol entity; and tunneling unacknowledged segmented data in the first transmitting link layer protocol entity from the first transmitting link layer protocol entity to the first receiving link layer protocol entity through the second transmitting link layer protocol entity and the second receiving link layer protocol entity.

2. The method as defined in claim 1, further comprising the step of:

transferring untransmitted unsegmented data in the first transmitting link layer protocol entity from the first transmitting link layer protocol entity to the second transmitting link layer protocol entity.

3. The method as defined in claim 1, further comprising the step of:

segmenting untransmitted unsegmented data in the first transmitting link layer protocol entity;

transferring the untransmitted segmented data in the first transmitting link layer protocol entity from the first transmitting link layer protocol entity to the second transmitting link layer protocol entity for tunneling.

4. The method as defined in claim 1, further comprising the step of:

assembling segmented data in the first transmitting link layer protocol entity; and transferring the assembled segmented data in the first transmitting link layer protocol entity from the first transmitting link layer protocol entity to the second transmitting link layer protocol entity.

5. The method as defined in claim 1, wherein the first pair of link layer protocol entities are controlled by at least one first control protocol entity, and the second pair of link layer protocol entities are controlled by at least one second control protocol entity, wherein the data transmissions from the first transmitting link layer protocol entity to the first receiving link layer protocol entity are suspended by the at least one first control protocol entity, and the data transmissions from the second transmitting link layer protocol entity to the second receiving link layer protocol entity are initiated by the at least one second control protocol entity.

6. The method as defined in claim 5, wherein the at least one first control protocol entity and the at least one second control protocol entity are the same control protocol entity.

7. The method as defined in claim 1, further comprising the step of:

sending a status message from the first receiving link layer protocol entity to the first transmitting link layer protocol entity prior to tunneling the unacknowledged segmented data from the first transmitting link layer protocol entity to the first receiving link layer protocol entity through the second transmitting link layer protocol entity and the second receiving link layer protocol entity.

8. The method as defined in claim 1, further comprising the step of:

notifying the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity.

9. The method as defined in claim 8, wherein the first pair of link layer protocol entities are controlled by at least one first control protocol entity, and the second pair of link layer protocol entities are controlled by at least one second control protocol entity, further comprising the step of:

sending a sequence number of a last unacknowledged data segment in the first transmitting link layer protocol entity from the at least one first control protocol entity to the at least one second control protocol entity to notify the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity.

10. The method as defined in claim 8, wherein the first pair of link layer protocol entities are controlled by at least one first control protocol entity, and the second pair of link layer protocol entities are controlled by at least one second control protocol entity, further comprising the step of:

sending from the at least one first control protocol entity to the at least one second control protocol entity an indication of the number of tunneled unacknowledged segmented data to notify the first receiving link layer protocol entity of the end of the unacknowledged segmented data tunneled from the first transmitting link layer protocol entity to the first receiving link layer protocol entity through the second transmitting link layer protocol entity and the second receiving link layer protocol entity.

11. The method as defined in claim 8, further comprising the step of:

sending a sequence number of a last unacknowledged data segment in the first transmitting link layer protocol entity from the first transmitting link layer protocol entity to the first receiving link layer protocol entity prior to tunneling the unacknowledged segmented data to notify the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity.

12. The method as defined in claim 8, further comprising the step of:

sending a message from the first transmitting link layer protocol entity to the first receiving link layer protocol entity after the last tunneled unacknowledged segmented data indicating that the previous tunneled unacknowledged segmented data was the last tunneled unacknowledged segmented data to notify the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity.

13. The method as defined in claim 8, further comprising the step of:

sending a message containing a sequence number of a last unacknowledged data segment in the first transmitting link layer protocol entity from the second transmitting link layer protocol entity to the second receiving link layer protocol entity prior to tunneling the unacknowledged segmented data to notify the first receiving link layer protocol entity of the end of the unacknowledged segmented data to be tunneled from the first transmitting link layer protocol entity to the first receiving link layer protocol entity through the second transmitting link layer protocol entity and the second receiving link layer protocol entity.

14. The method as defined in claim 13, further comprising the steps of:

signaling the sequence number to the second transmitting link layer protocol entity from the first transmitting link layer protocol entity prior to sending the message; and signaling the sequence number to the first receiving link layer protocol entity from the second receiving link layer protocol entity after sending the message.

15. The method as defined in claim 8, further comprising the step of:

sending from the second transmitting link layer protocol entity to the second receiving link layer protocol entity an indication of the number of tunneled unacknowledged segmented data to notify the first receiving link layer protocol entity of the end of the unacknowledged segmented data tunneled from the first transmitting link layer protocol entity to the first receiving link layer protocol entity through the second transmitting link layer protocol entity and the second receiving link layer protocol entity.

16. The method as defined in claim 15, further comprising the steps of:

signaling the number of tunneled unacknowledged segmented data to the second transmitting link layer protocol entity from the first transmitting link layer protocol entity prior to sending the indication; and signaling the number of tunneled unacknowledged segmented data to the first receiving link layer protocol entity from the second receiving link layer protocol entity after sending the indication.

17. The method as defined in claim 8, further comprising the step of:

sending a message from the second transmitting link layer protocol entity to the second receiving link layer protocol entity containing an indication of the amount of tunneled unacknowledged segmented data to notify the first receiving link layer protocol entity of the end of the unacknowledged segmented data tunneled from the first transmitting link layer protocol entity to the first receiving link layer protocol entity through the second transmitting link layer protocol entity and the second receiving link layer protocol entity.

18. The method as defined in claim 8, wherein the first pair of link layer protocol entities are controlled by at least one first control protocol entity, and the second pair of link layer protocol entities are controlled by at least one second control protocol entity, further comprising the step of:

sending from the at least one first control protocol entity to the at least one second control protocol entity an indication of the amount of tunneled unacknowledged segmented data to notify the first receiving link layer protocol entity of the end of the unacknowledged segmented data tunneled from the first transmitting link layer protocol entity to the first receiving link layer protocol entity through the second transmitting link layer protocol entity and the second receiving link layer protocol entity.

19. The method as defined in claim 8, further comprising the steps of:

signaling to the second transmitting link layer protocol entity from the first transmitting link layer protocol entity the end of the unacknowledged segmented data to be tunneled from the first transmitting link layer protocol entity to the first receiving link layer protocol entity through the second transmitting link layer protocol entity and the second receiving link layer protocol entity;

sending a message from the second transmitting link layer protocol entity to the second receiving link layer protocol entity indicating the end of the unacknowledged segmented data to be tunneled from the first transmitting link layer protocol entity to the first receiving link layer protocol entity through the second transmitting link layer protocol entity and the second receiving link layer protocol entity; and signaling to the first receiving link layer protocol entity from the second receiving link layer protocol entity the end of the unacknowledged segmented data to be tunneled from the first transmitting link layer protocol entity to the first receiving link layer protocol entity through the second transmitting link layer protocol entity and the second receiving link layer protocol entity.

20. The method as defined in claim 8, further comprising the step of:
terminating the first pair of link layer protocol entities after all of the unacknowledged segmented data has been tunneled.

21. The method as defined in claim 1, further comprising the step of:
terminating the first pair of link layer protocol entities after a predetermined period of time.

22. The method as defined in claim 1, wherein the transition from the first pair of link layer protocol entities to the second pair of link layer protocol entities is due to a handover in the mobile communication system.

23. The method as defined in claim 1, wherein the transition from the first pair of link layer protocol entities to the second pair of link layer protocol entities is due to a protocol reconfiguration in the mobile communication system.

24. The method as defined in claim 23, wherein the first pair of link layer protocol entities utilize the same protocol as the second pair of link layer protocol entities.

25. The method as defined in claim 24, wherein the first pair of link layer protocol entities is configured differently than the second pair of link layer protocol entities.

26. The method as defined in claim 23, wherein the first pair of link layer protocol entities utilize a different protocol than the second pair of link layer protocol entities.

27. The method as defined in claim 1, wherein the step of tunneling unacknowledged segmented data in the first transmitting link layer protocol entity from the first transmitting link layer protocol entity to the first receiving link layer protocol entity through the second transmitting link layer protocol entity and the second receiving link layer protocol entity includes the steps of:
sending the unacknowledged segmented data from the first transmitting link layer protocol entity to the second transmitting link layer protocol entity;
transmitting the unacknowledged segmented data from the second transmitting link layer protocol entity to the second receiving link layer protocol entity; and
sending the unacknowledged segmented data from the second receiving link layer protocol entity to the first receiving link layer protocol entity.

28. The method as defined in claim 27, further comprising the step of:
marking the unacknowledged segmented data before it is transmitted from the second transmitting link layer protocol entity to the second receiving link layer protocol entity.

29. The method as defined in claim 28, wherein the unacknowledged segmented data is marked utilizing a length indicator field in an acknowledged mode data protocol data unit.

30. The method as defined in claim 28, wherein the unacknowledged segmented data is marked utilizing a special field in a control protocol data unit.

31. The method as defined in claim 27, wherein the unacknowledged segmented data is transmitted from the second transmitting link layer protocol entity to the second receiving link layer protocol entity over a dedicated communication link.

32. The method as defined in claim 27, wherein the unacknowledged segmented data is transmitted from the second transmitting link layer protocol entity to the second receiving link layer protocol entity before any higher layer data so as to insure sequence order integrity.

33. The method as defined in claim 1, further comprising the step of:
combining tunneled unacknowledged segmented data with acknowledged segmented data in the first receiving link layer protocol entity; and
assembling the combined segmented data.

34. The method as defined in claim 33, further comprising the step of:
sending the assembled combined data directly to a higher layer protocol entity.

35. The method as defined in claim 33, further comprising the step of:
sending the assembled combined data to a higher layer protocol entity through the second receiving link layer protocol entity.

36. The method as defined in claim 33, further comprising the step of:
sending the assembled combined data to a higher layer protocol entity before the second receiving link layer protocol entity sends any data to the higher layer protocol entity so as to insure sequence order integrity.

37. The method as defined in claim 36, further comprising the step of:
notifying the second receiving link layer protocol entity that all the assembled combined data has been sent to the higher layer protocol entity so as to insure sequence order integrity.

38. The method as defined in claim 1, wherein the first pair of link layer protocol entities and the second pair of link layer protocol entities are automatic repeat request protocol entities.

39. An apparatus for providing a secure link when transitioning between pairs of link layer protocol entities in a mobile communication system, the apparatus comprising:
a first pair of link layer protocol entities, the first pair of link layer protocol entities including a first transmitting link layer protocol entity for segmenting data and transmitting segmented data and a first receiving link layer protocol entity for receiving segmented data from the first transmitting link layer protocol entity and acknowledging the received segmented data; and
a second pair of link layer protocol entities, the second pair of link layer protocol entities including a second transmitting link layer protocol entity for segmenting data and transmitting segmented data and a second receiving link layer protocol entity for receiving segmented data from the second transmitting link layer protocol entity and acknowledging the received segmented data;
wherein the first pair of link layer protocol entities are configured to suspend data transmissions from the first transmitting link layer protocol entity to the first receiving link layer protocol entity when transitioning from the first pair of link layer protocol entities to the second pair of link layer protocol entities;
wherein the second pair of link layer protocol entities are configured to initiate data transmissions from the second transmitting link layer protocol entity to the second receiving link layer protocol entity when transitioning from the first pair of link layer protocol entities to the second pair of link layer protocol entities; and wherein the first pair of link layer protocol entities and the second pair of link layer protocol entities are configured to tunnel unacknowledged segmented data in the first transmitting link layer protocol entity from the first transmitting link layer protocol entity to the first receiving link layer protocol entity through the second transmitting link layer protocol entity and the second receiving link layer protocol entity after transitioning from the first pair of link layer protocol entities to the second pair of link layer protocol entities.

40. An article of manufacture for providing a secure link when transitioning from a first pair of link layer protocol entities to a second pair of link layer protocol entities in a mobile communication system, the first pair of link layer protocol entities including a first transmitting link layer protocol entity for segmenting data and transmitting segmented data and a first receiving link layer protocol entity for receiving segmented data from the first transmitting link layer protocol entity and acknowledging the received segmented data, the second pair of link layer protocol entities including a second transmitting link layer protocol entity for segmenting data and transmitting segmented data and a second receiving link layer protocol entity for receiving segmented data from the second transmitting link layer protocol entity and acknowledging the received segmented data, the article of manufacture comprising:

at least one processor readable carrier; and instructions carried on the at least one carrier; wherein the instructions are configured to be readable from the at least one carrier by at least one processor and thereby cause the at least one processor to operate so as to:

suspend data transmissions from the first transmitting link layer protocol entity to the first receiving link layer protocol entity;

initiate data transmissions from the second transmitting link layer protocol entity to the second receiving link layer protocol entity; and tunnel unacknowledged segmented data in the first transmitting link layer protocol entity from the first transmitting link layer protocol entity to the first receiving link layer protocol entity through the second transmitting link layer protocol entity and the second receiving link layer protocol entity.

* * * * *